United States Patent [19]
Janke et al.

[11] Patent Number: 5,932,135
[45] Date of Patent: *Aug. 3, 1999

[54] DEICING COMPOSITION AND METHOD

[75] Inventors: George A. Janke, 5600 N. Poinsettia, #1507, West Palm Beach, Fla. 33407; Warren D. Johnson, Jr., Palm City, Fla.

[73] Assignee: George A. Janke, West Palm Beach, Fla.

[*] Notice: This patent is subject to a terminal disclaimer.

[21] Appl. No.: 09/009,174

[22] Filed: Jan. 20, 1998

Related U.S. Application Data

[63] Continuation-in-part of application No. 08/620,127, Mar. 21, 1996, Pat. No. 5,709,813.

[51] Int. Cl.⁶ .............................. C09K 3/18; C09K 3/00; C23F 15/00
[52] U.S. Cl. ................ 252/70; 106/13; 106/14.05; 106/14.11; 106/14.44; 252/388; 252/389.1
[58] Field of Search .................. 252/70, 388, 389.1; 106/13, 14.05, 14.11, 14.44

[56] References Cited

U.S. PATENT DOCUMENTS

| | | | |
|---|---|---|---|
| 1,581,179 | 4/1926 | Crofoot | 252/73 |
| 3,489,596 | 1/1970 | Plump | 427/408 |
| 3,897,348 | 7/1975 | Atkinson | 510/521 |
| 3,976,581 | 8/1976 | Rose | 510/521 |
| 4,035,517 | 7/1977 | Magny et al. | 426/31 |
| 4,259,640 | 3/1981 | della Faille d'huysse et al. | 324/439 |
| 4,277,411 | 7/1981 | Yahl | 554/15 |
| 4,283,297 | 8/1981 | Peters et al. | 252/70 |
| 4,343,907 | 8/1982 | Graefe | 435/290.1 |
| 4,430,240 | 2/1984 | Sandvig et al. | 252/70 |
| 4,585,571 | 4/1986 | Bloom | 106/13 |
| 4,587,027 | 5/1986 | Preusch et al. | 252/73 |
| 4,588,512 | 5/1986 | Rippie | 252/70 |
| 4,664,832 | 5/1987 | Sandvig | 252/70 |
| 4,676,918 | 6/1987 | Toth et al. | 252/70 |
| 4,746,449 | 5/1988 | Peel | 252/70 |
| 4,824,588 | 4/1989 | Lin | 252/70 |
| 4,937,104 | 6/1990 | Puhringer | 427/344 |
| 4,953,360 | 9/1990 | Rzechula | 62/66 |
| 5,089,052 | 2/1992 | Ludwig | 106/276 |
| 5,135,674 | 8/1992 | Kuhajek et al. | 252/70 |
| 5,149,535 | 9/1992 | Meinhardt et al. | 424/195.1 |
| 5,232,729 | 8/1993 | Katsuta et al. | 426/573 |
| 5,283,322 | 2/1994 | Martin et al. | 530/374 |
| 5,302,307 | 4/1994 | Ireland | 252/70 |
| 5,324,442 | 6/1994 | Mathews | 252/70 |
| 5,366,650 | 11/1994 | Wiesenfeld et al. | 252/70 |
| 5,376,292 | 12/1994 | Lucas | 252/70 |
| 5,563,069 | 10/1996 | Yang | 435/295.3 |
| 5,635,101 | 6/1997 | Janke et al. | 106/13 |
| 5,637,251 | 6/1997 | Karol et al. | 252/77 |
| 5,645,755 | 7/1997 | Wiesenfeld et al. | 252/70 |
| 5,650,090 | 7/1997 | Salyer | 252/70 |
| 5,651,915 | 7/1997 | Ossian et al. | 252/70 |
| 5,651,916 | 7/1997 | Weir | 252/74 |
| 5,653,054 | 8/1997 | Savignano et al. | 47/2 |
| 5,667,718 | 9/1997 | Jones et al. | 252/70 |
| 5,674,428 | 10/1997 | Lott et al. | 252/70 |
| 5,681,882 | 10/1997 | Jenkins et al. | 252/70 |
| 5,683,619 | 11/1997 | Ossian et al. | 252/70 |
| 5,709,812 | 1/1998 | Janke et al. | 252/70 |
| 5,709,813 | 1/1998 | Janke et al. | 252/70 |

FOREIGN PATENT DOCUMENTS

| | | | |
|---|---|---|---|
| 2135662 | 5/1996 | Canada | 106/13 |
| 0221269 | 8/1986 | Germany . | |
| 873293 | 6/1987 | Germany . | |
| 3733080 | 9/1987 | Germany | 252/70 |

OTHER PUBLICATIONS

PCT International Search Report, completed Jul. 4, 1997 for PCT/US97/04374.
PCT International Search Report, completed Apr. 28, 1997 for PCT/US97/01008.
PCT International Search Report, completed Jul. 4, 1997 for PCT/US97/04440.
JAPIO Patent Abstract No. JP354064696A, abstract of Japanese Patent Specification No. 54–064696, May 1979.
JAPIO Patent Abstract No. JP404094668A, abstract of Japanese Patent Specificationi No. 04–094668, Mar. 1992.

*Primary Examiner*—Anthony Green
*Attorney, Agent, or Firm*—Baker & Botts, LLP

[57] ABSTRACT

Disclosed is a new and improved, environmentally acceptable and negligibly corrosive deicing composition comprising by-products from the fermentation and production of wine from grapes and other fruit, as well as from grains. The main ingredients of the present invention are the solubles that settle during the fermentation process, said solubles being commonly known in the wine making industry as "Vintners' Condensed Solubles", and less technically known as "wine bottoms" and "lees". The invention also relates to the use of a deicing composition in a manner that helps to reduce the buildup of snow and ice on roads, bridges and other outdoor surfaces. The invention also relates to a corrosion-inhibiting composition which comprises vintner's condensed solubles. Other embodiments and uses of the invention will be apparent to those skilled in the art from consideration of the specific practice of the invention disclosed herein.

20 Claims, No Drawings

DEICING COMPOSITION AND METHOD

REFERENCE TO RELATED APPLICATIONS

This patent application is a continuation-in-part of a U.S. patent application Ser. No. 08/620,127 filed Mar.21, 1996, which issued as U.S. Pat. No. 5,709,813 on Jan. 20, 1998.

FIELD OF THE INVENTION

The present invention is directed to an environmentally acceptable and negligibly corrosive deicing and anti-icing composition comprising by-products from the fermentation and production of wine from grapes and other fruit, as well as from grains. The invention also relates to the use of the deicing and anti-icing composition in a manner that helps to inhibit the buildup of snow and ice on roads, bridges, runways, taxiways and other outdoor surfaces.

BACKGROUND OF THE INVENTION

It is well known that the ice and snow located on roads and bridges significantly slow traffic and pose increased danger to the general public. Mechanical snow removal is often used to alleviate some of the traffic problems. It is also known that chemical compounds, such as chloride salts, whether in solid form or in solution or in admixture with sand and other substances, are often used to treat the roadways to melt snow and ice. Most deicing compounds, however, are environmentally harmful, and therefore, municipalities may be restricted in the amounts and types of substances that they may use to help control the buildup of snow and ice.

Most chemicals used to treat roadways are detrimental for the following reasons: They damage the soil and surrounding vegetation because the salts turn the soil alkaline and are also absorbed into the root systems of the plants; They damage freshwater streams, rivers and lakes and are often absorbed into underground water systems; and, The salts cause significant damage to vehicles, as well as concrete and metallic structures that are near roadways because of the corrosive effects of said salts. It is well known that many salts cause spalling in concrete structures, which significantly reduce the strength and life of such structures. In municipal areas, salt is also believed to result in dangerous situations. It is believed that salt water that leaks down through manhole covers causes the outer layers of electrical cables beneath the manholes to erode and eventually lead to short circuits, which may spark and ignite accumulated methane or other gases, causing serious and sometimes deadly explosions. For the foregoing reasons, many states have banned the use of salts, while others have placed significant restrictions on the usage of salts.

It is known that it is desirable to replace the corrosive salts with non-corrosive substances, such as alcohols and glycols, but because of their flammability, toxicity and expense, these other substances have not been effectively and economically utilized to date.

SUMMARY OF THE INVENTION

A composition for inhibiting the accumulation of snow and ice comprises a wine-making residue. In another embodiment, an antifreeze and deicing composition for inhibiting the accumulation of snow and ice on outdoor surfaces comprises a wine-making residue and water. In another embodiment an antifreeze and deicing composition for inhibiting the accumulation of ice and snow on roadways comprises: a mixture of (1) at least one component selected from the group consisting of sodium chloride, calcium chloride, potassium chloride, magnesium chloride, calcium magnesium acetate and urea, and (2) an aqueous solution of a wine-making residue and water. In another embodiment a method for inhibiting the accumulation of snow and ice on outdoor surfaces comprises: applying to the outdoor surfaces, or to the snow and ice accumulated thereon, a composition comprising a wine-making residue. In another embodiment, a corrosion-inhibiting composition which comprises a wine-making residue and water.

The present invention is directed to an environmentally acceptable anti-freeze and deicing composition comprising a by-product of a the fermentation and production of wine from grapes and other fruit, as well as from grains, such as the rice used in the production of sake and other rice wines. The wine process consists of fermenting liquids that are extracted from said fruits or grains. With rice wine, the starches are usually converted to sugar prior to fermentation. The present invention is directed at the non-potable solubles that settle to the bottom of the wine vats. The bottom liquids may be concentrated at 50% solubles, which solubles, after the liquid is evaporated and/or dried, are recovered typically for use as nutritional additives in feeds for livestock and/or fertilizer/mulching material for vineyards. These solubles are commonly known in the wine making industry as "Vintners' Condensed Solubles" (or, more simply, "VCS"). The solubles are also referred to as "wine bottoms" and "lees". The condensed composition is water soluble, negligibly corrosive, inexpensive, and widely-available in large quantities. The present invention is also directed to the use of said deicing composition to inhibit the accumulation of ice and snow on roads, bridges, runways taxiways and other outdoor surfaces.

Generally, substances that are to be used as deicers must have the following characteristics: suitable water solubility; a low freezing temperature in solution; availability on an industrial scale at a low cost; non-corrosiveness; environmentally acceptable; and capable of being applied by generally known and available means.

In view of the foregoing, a technical advantage of the present invention to provide an anti-freeze and deicing composition suitable for inhibiting the accumulation of snow and ice, which composition is water soluble, has a low freezing temperature, is cheaply and readily available in large industrial quantities throughout the world, is negligibly corrosive, is environmentally friendly, and is capable of being applied with currently available equipment and by existing crews.

A related technical advantage of the present invention is to provide an environmentally friendly, negligibly corrosive deicing composition at a cost-competitive price.

Yet another technical advantage of the present invention is to provide an environmentally friendly, negligibly corrosive deicing composition that may be used in admixtures with sand, river gravel, cinders, sawdust, and/or other skid-reducing, manufactured grit and subsequently applied to roads, bridges, runways, taxiways and other surfaces where it is desirable to inhibit the accumulation of snow and ice on said surfaces.

Another technical advantage of the present invention is to provide an environmentally friendly deicing composition that may be used to pretreat roads, bridges and other outdoor surfaces prior to the accumulation of snow and ice to prevent the adherence of snow and ice to said surfaces.

Yet another technical advantage of the present invention is to provide an environmentally friendly, negligibly corrosive deicing composition that may be used in admixtures or mixtures with other chemical deicing agents (such as sodium chloride, calcium chloride, potassium chloride, magnesium chloride, calcium magnesium acetate and/or urea) and/or skid-reducing chemical agents and subsequently applied to roads, bridges, runways, taxiways, and other surfaces where it is desirable to inhibit the accumulation of snow and ice on said surfaces.

Another technical advantage of the present invention is to provide a process for inhibiting the accumulation of snow and ice on roads, bridges, runways, taxiways and other outdoor surfaces, which process comprises applying the deicing composition of the present invention onto such surfaces, either by itself prior to ice or snow, or in mixture or admixture with chemical deicing or other skid-reducing additives.

Other embodiments and advantages of the invention are set forth, in part, in the description which follows and, in part, will be obvious from this description or may be learned from the practice of the invention.

DESCRIPTION OF A PREFERRED EMBODIMENT

The deicing composition of the present invention is a by-product of the fermentation and production of wine from grapes and other fruit, as well as from grains, such as the rice used in the production of sake and other rice wines. The wine process consists of fermenting liquids that are extracted from said fruit or grain at a sugar content of approximately 10–14% sugar. With rice wine, the starches are usually converted to sugar prior to fermentation. The active ingredients of the present invention are the non-potable solubles that settle to the bottom of the wine vat. The bottom liquids may be typically concentrated at 50% solubles, which solubles, after the liquid is evaporated and/or dried, are recovered typically for use as nutritional additives in feeds for livestock and/or fertilizer/mulching material for vineyards. These solubles are commonly known in the wine making industry as "Vintners' Condensed Solubles" (or, more simply, "VCS"). The solubles are also referred to as "wine bottoms" and "lees".

A fermentation process by-product is used as the active substance in the composition of the present invention. Accordingly, the deicing composition of the present invention comprises VCS, which composition may be further admixed with optional additives. As optional additives, the following substances may be used: sand, river gravel, cinders, sawdust, and/or other skid-reducing, manufactured grit, as well as other chemical deicing agents (such as sodium chloride, calcium chloride, potassium chloride, magnesium chloride, calcium magnesium acetate and/or urea). Another optional additive is water. The compositions of the present invention are excellently suited to serve as antifreeze and deicing agents for inhibiting the accumulation of snow and ice on roads, bridges and other surfaces. Optimally, the deicing composition of the present invention is applied to road surfaces prior to the accumulation of snow and ice, which application will help prevent the snow and ice from adhering to the road surfaces. Subsequent to the accumulation of snow and ice, the deicing composition of the present invention is again applied, but this time to the accumulated snow and ice. The two-step application will facilitate removal of the accumulated snow and ice by plows and other mechanical methods.

Given that many municipalities typically purchase bulk quantities of chloride salts and other chemical anti-icing agents, it is foreseeable that the composition of the present invention may be mixed or admixed with sodium chloride, calcium chloride, potassium chloride, magnesium chloride, calcium magnesium acetate and/or urea (though the addition of chloride salts, depending on its concentration, may degrade the low corrosiveness and the environmentally friendliness of the present invention). Once they have purchased the large quantities of other chemicals, most municipalities may be inclined to utilize such chemicals even if they must mix only a small amount with the more effective, more acceptable composition of the present invention, though clearly, such a combination is less than optimal from the environmental perspective.

The deicing composition of the present invention also serves as a corrosion inhibiting agent when mixed with corrosive salts. Tests have shown that the corrosive effect of an admixture of the composition of the present invention with a five percent by weight of chloride salts is significantly less than for example, an admixture of 95 percent water and five percent salts. Thus, the composition of the present invention may be effectively mixed with small amounts of salt without significantly affecting the other characteristics of the composition.

According to a further aspect of the present invention, a process for inhibiting the accumulation of snow and ice on road surfaces is provided, said process comprising the application of the composition of the present invention onto the road surfaces prior to icing or snow accumulation. The composition may be preferably applied onto the road surface from moving vehicles in an amount of 20 to 60 gallons per lane mile (GPLM), which is 200 to 600 pounds per lane mile, which is also equivalent to 0.48 to 1.44 ounces per square yard. The composition may also be applied after snow and ice has accumulated in order to melt said snow and ice.

There are no known or identified hazards to humans, animals or the environment from the handling, storing, or using VCS. VCS is currently used as a low grade animal feed additive and as a fertilizer/mulching material for vineyards.

The composition of the present invention may also be cost effectively utilized by airports to prevent the accumulation of snow and ice on runways and taxiways. Many airports today use glycols for deicing an airplane's wings and stabilizers, for which the airports must pay sewage treatment processing fees for treatment of the runoff. Such fees may range up to $3.00 per gallon of glycol-contaminated water. Further testing may show that the composition of the present invention may be used to replace the use of glycol for these purposes. The elimination of glycol is better for the environment and avoids the need for processing glycol contaminated water, which process demands the utmost in quality control techniques.

The following examples illustrate embodiments of the present invention, but should not be viewed as limiting the scope of the invention.

EXAMPLES

VCS Formed By a Wine-Making Process

VCS is commonly formed as a byproduct of a wine-making process. Though the actual composition of VCS so formed varies by region, vineyard, grape, fruit or grain stock, and the type of yeast used for fermentation, one batch of VCS had the following content:

| ITEM | DRY BASIS (No Moisture) | CONDENSED (48% solids/52% Moisture) |
| --- | --- | --- |
| Crude Protein | 33.0% | 16.0% |
| Crude Fat | 0.2% | 0.1% |
| Crude Fiber | 5.2% | 2.51% |
| Total Carbohydrates | 50.0% | 25.0% |
| Unfermented Sugars | 3.6% | 1.8% |
| Phosphorus | 2.31% | 1.12% |
| Sulfur | 0.56% | 0.27% |
| Potassium | 2.74% | 1.32% |
| Magnesium | 1.08% | 0.52% |
| Sodium | 0.13% | 0.06% |
| Iron | 145 ppm | 70 ppm |
| Aluminum | 22 ppm | 10 ppm |
| Manganese | 34 ppm | 17 ppm |

-continued

| ITEM | DRY BASIS (No Moisture) | CONDENSED (48% solids/52% Moisture) |
|---|---|---|
| Copper | 8 ppm | 4 ppm |
| Zinc | 140 ppm | 68 ppm |
| Tartaric Acid | trace | trace |
| Malic Acid | trace | trace |
| Acetic Acid | trace | trace |
| Ascorbic Acid | trace | trace |
| Cream of Tarter | 1.20% | 0.60% |
| Yeast | 2.20% | 1.10% |

The above composition is intended only to be a representative composition, and the absence of one of more of listed items, or the presence of additional unlisted items, is not deemed to limit the present invention. Moreover, the percentages of the various components may also vary by region, vineyard, grape, fruit or grain stock, and the type of yeast used in the fermentation process. Therefore, it is contemplated, for example, that VCS may have between about 15% and about 50% by weight of crude protein, from about 0.1% to about 2.0% by weight of crude fat, or from about 20% to about 60% by weight of carbohydrates. The above specified ranges are merely exemplary and are not intended to limit the scope of the invention.

VCS Mixtures

A composition for inhibiting the accumulation of snow and ice may comprise VCS by itself. Alternatively, a composition comprising VCS and water may be used. The water content may vary, but preferably, at least 5% by weight of the composition is water. The percentage of VCS may also vary. Preferably, there is at least 10% by weight of VCS, more preferably at least 20%, and more preferably, at least 30%.

Alternative embodiments include at least one component selected from the group consisting of sodium chloride, calcium chloride, potassium chloride, magnesium chloride, calcium magnesium acetate and urea.

In another embodiment, a corrosion-inhibiting composition which comprises a wine-making residue and water. The water content may vary, but preferably, at least 5% by weight of the composition is water. The percentage of VCS may also vary. Preferably, there is at least 10% by weight of VCS, more preferably at least 20%, and more preferably, at least 30%.

ADVANTAGES

The main advantages of the composition according to the present invention may be summarized as follows:

1) The composition of the present invention is neither unacceptably corrosive nor environmentally damaging. This is a significant advantage over known compositions which damage vehicles, road ways, and the surrounding environment.
2) The composition of the present invention has a freezing point below 0° F. It is liquid and free flowing at temperatures at least as low as −10° F., and may be easily sprayed and applied to road surfaces or accumulated ice or snow at ambient winter temperatures. The composition may also be heated before its application to facilitate pumping and to enhance the deicing effect.
3) The composition may be applied in comparatively small amounts because once applied to the road surface, the composition of the present invention tends to remain in place and is not easily blown away by the wind or by the action of passing traffic, and the composition tends to prevent the adherence of snow and ice to the surfaces upon which it is applied.
4) The composition may be applied during any prevailing temperature and/or prior to impending snow and ice storms.
5) The composition may easily be applied to the roadways with uniformity using readily available equipment without any special training for the application crews.
6) The composition may be applied in the form of a solution, which allows for quick and even application by vehicles, even at speeds of 35 mph or more.
7) The composition is a low grade, low price industrial by-product available in large quantities in many of the states located in the Snow Belt. Its availability in potential market areas may help keep costs down because the proximity of the solution to the problem areas reduces the transportation costs.
8) The composition is a renewable agricultural by-product and its commercial usage may help support U.S. farmers and the agricultural industry.
9) The composition of the present invention is biodegradable, and yet has a low biological oxygen demand (BOD). The BOD of a substance is a unit-less number that represents the ratio of oxygen utilized (in lbs.) per pound of said substance. The BOD in effect represents the metabolic needs of aerobic microorganisms in organically rich matter. Most known deicers are not bio-degradable (and hence have a BOD of 0)—instead, they accumulate and become poisonous to the environment. One known deicer which is biodegradable is calcium magnesium acetate (CMA), but the present invention has a substantially lower BOD than does CMA.
10) The composition of the present invention may be cost effectively utilized by airports to prevent the accumulation of snow and ice on runways and taxiways, hence eliminating or further reducing the need for other chemical deicers which are known to be environmentally unfriendly.

SUMMARY OF TESTING

Further details of the present invention are to be found in the following test results without limiting the scope of protection to the specified mixture of composition of the present invention. For the tests, mill run VCS, concentrated at approximately 50% by weight of dry substance, is applied at an external temperature of 14° F. to a 3.5 inch thick snow sheet of approximately 20 square yards without any additive. For comparison, a readily recognized and available mixture of industrial salts and sand is applied to a second 3.5 inch thick snow sheet of approximately 20 square yards in a nearby location. It was found that the melting effect of the composition having a dry substance content of 50% by weight is superior to that of the mixture of salt and sand, both in duration of effect and the strength of activity. The composition of the present invention having a dry substance content of 50% by weight exhibited a melting effect one hour and a half earlier than the mixture of salt and sand. Moreover, the 50% concentration of the present invention is active even at temperatures at least as low as −10° F., while the melting effect of the salt and sand mixture slows and completely stops at approximately 20° F.

Further testing was done utilizing varying concentration of VCS, varying between 30% and 60% by weight of dry substance, and at various ambient temperatures. Tests were conducted for anti-icing prior to icing, as well as for deicing subsequent to icing. In all cases the results of the VCS product were equal to superior to the other known, currently used deicing agents.

Additional testing has been performed to evaluate the composition of the present invention for corrosiveness, biological degradation demands, and efficacy at varying temperatures. The results are discussed below.

CORROSION TESTS

Mild steel bolts were immersed in various concentrations of VCS. After four months of immersion, the bolts showed virtually no evidence of rust or oxidation. Laboratory corrosion tests measured the corrosive effect at 0.57 mils per year (MPY), which is much lower than any other chemical deicing agent and is a small fraction of the corrosiveness of pure water. A MPY measurement of approximately 13 is generally considered by the deicing industry to be acceptable, while a negative number indicates that the product, when mixed with distilled water, actually lowers the corrosiveness of the distilled water.

Mild steel bolts were sprayed regularly with various concentrations of VCS. After four months of regular spraying, the bolts showed virtually no evidence of rust or oxidation. Instead of corroding, the bolts appeared to have been sealed by a layer of dried VCS, which coating appeared to be protective rather than destructive.

The following table summarizes some of the test results:

| MATERIAL | CORROSION (mils per year - MPY) |
| --- | --- |
| Mild Steel | 0.57 |
| Stainless Steel | None detectable |
| Aluminum | None detectable |

In comparison, mild steel bolts subjected to similar test conditions as described above, but utilizing mixtures of water and with 5% concentrations of various chloride salts, exhibited extreme corrosion, rust, and deterioration.

ENVIRONMENTAL TESTS

Tests were performed to measure the biological oxygen demand (in pounds) per pound of various mixtures of the composition of the present invention. Again, the BOD represents the metabolic needs of aerobic microorganisms in organic matter. Results appear below:

| CONCENTRATION (by weight) | BOD DEMAND (lb. of $O_2$ per lb. of material) |
| --- | --- |
| 25% solids | .13–.15 |
| 48% solids | .21–.26 |

The composition of the present invention is currently used as a low grade animal feed additive, as well as a fertilizing/mulching material for grape vineyards. Because it is widely accepted by the livestock industries and is not known to leave deleterious traces of any harmful substances in the animals being fed, it is believed to be completely safe to the environment and safe to handle as well.

FREEZING, DEICING, AND ANTI-ICING TESTS

The following results describe the consistency of a mixture of the present invention concentrated at 48% solids:

| TEMPERATURE (° F.) | DESCRIPTION | VISCOSITY (SSU) |
| --- | --- | --- |
| +20 | Free Flowing Liquid | 580 |
| +10 | Free Flowing Liquid | 900 |
| −5 | Free Flowing Liquid | 1300 |
| −20 | Slow Flowing Liquid | 2400 |

The following table summarizes the freezing points and provides more quantitative information on a typical mill run VCS solution containing approximately 50% solubles:

| SOLUTION CONCENTRATION | | FREEZING TEMPERATURE | VISCOSITY (SSU) | | | |
| --- | --- | --- | --- | --- | --- | --- |
| (° Brix) | (° Baumé) | (° F.) | (@20° F.) | (@70° F.) | BOD | pH |
| 48 | 29 | −28 | 580 | 200 | .22 | 4.1 |
| 50 | 30 | −20 | 600 | 280 | .23 | 3.9 |

"Brix" is the measurement on a hydrometer scale that indicates the relative percentage by weight of a substance in solution. "Baumé" is a measurement on a hydrometer scale that indicates the specific gravity of a substance.

While the melting effect of chloride salts is limited (ineffective below approximately 20° F.), the melting effect of the composition of the present invention, as demonstrated by the tables above, is active even at temperatures as low as −10° F.

What is claimed is:

1. A deicing composition comprising an effective amount of a wine-making residue for inhibiting the accumulation of snow and ice.

2. The composition of claim 1 further comprising at least one component selected from the group consisting of sodium chloride, calcium chloride, potassium chloride, magnesium chloride, calcium magnesium acetate and urea.

3. The composition of claim 1 further comprising a skid-reducing aggregate selected from the group consisting of sand, river gravel, cinders, sawdust, and manufactured grit.

4. The composition of claim 1, comprising at least 30% wine making residue.

5. An antifreeze and deicing composition for inhibiting the accumulation of snow and ice on outdoor surfaces, which composition comprises at least 10% of a wine-making residue and at least 5% of water.

6. The composition of claim 5 further comprising at least one component selected from the group consisting of sodium chloride, calcium chloride, potassium chloride, magnesium chloride, calcium magnesium acetate and urea.

7. The composition of claim 6, wherein said at least one component is sodium chloride.

8. The composition of claim 6, wherein said at least one component is magnesium chloride.

9. An antifreeze and deicing composition for inhibiting the accumulation of ice and snow on roadways, which composition comprises: a mixture of (1) at least one component selected from the group consisting of sodium chloride, calcium chloride, potassium chloride, magnesium chloride, calcium magnesium acetate and urea, and (2) an aqueous solution of at least 10% of a wine-making residue and at least 5% water.

10. The composition of claim 9, wherein said at least one component is sodium chloride.

11. The composition of claim 9, wherein said at least one component is calcium magnesium acetate.

12. The composition of claim 9, wherein said at least one component is magnesium chloride.

13. The composition of claim 9, wherein said aqueous solution contains at least 20% by weight of the wine-making residue.

14. The composition of claim 9, wherein said aqueous solution contains at least 30% by weight of the wine-making residue.

15. A method for inhibiting the accumulation of snow and ice on outdoor surfaces, which method comprises: applying to the outdoor surfaces, or to the snow and ice accumulated thereon, a composition comprising an effective inhibiting amount of a wine-making residue.

16. The method of claim 15, wherein the composition further contains at least one component selected from the group consisting of sodium chloride, calcium chloride, potassium chloride, magnesium chloride, calcium magnesium acetate and urea.

17. The method of claim 15, wherein the composition comprises at least 30% of wine making residue.

18. A corrosion-inhibiting composition which comprises at least 10% of a wine-making residue and at least 5% water.

19. The corrosion-inhibiting composition of claim 18 wherein said composition comprises at least 20% by weight of the wine-making residue and at least 5% by weight of water.

20. The corrosion-inhibiting composition of claim 18 wherein said composition comprises at least 30% by weight of the wine-making residue and at least 5% by weight of water.

* * * * *